United States Patent
Aizawa et al.

(10) Patent No.: US 10,851,521 B2
(45) Date of Patent: Dec. 1, 2020

(54) CONSTRUCTION MACHINE

(71) Applicant: Hitachi Construction Machinery Co., Ltd., Tokyo (JP)

(72) Inventors: Taiki Aizawa, Tsuchiura (JP); Shinji Nishikawa, Kasumigaura (JP); Kouichi Shibata, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 41 days.

(21) Appl. No.: 16/329,951

(22) PCT Filed: Feb. 21, 2018

(86) PCT No.: PCT/JP2018/006246
§ 371 (c)(1),
(2) Date: Mar. 1, 2019

(87) PCT Pub. No.: WO2018/163826
PCT Pub. Date: Sep. 13, 2018

(65) Prior Publication Data
US 2019/0194909 A1 Jun. 27, 2019

(30) Foreign Application Priority Data
Mar. 7, 2017 (JP) .................. 2017-042689

(51) Int. Cl.
*E02F 9/22* (2006.01)
*E02F 3/43* (2006.01)
(Continued)

(52) U.S. Cl.
CPC .............. *E02F 9/2235* (2013.01); *B60K 6/36* (2013.01); *B60K 6/485* (2013.01); *B60W 10/10* (2013.01);
(Continued)

(58) Field of Classification Search
CPC ... E02F 9/2235; E02F 9/22; E02F 9/20; E02F 3/435; E02F 9/2271; E02F 3/425;
(Continued)

(56) References Cited

U.S. PATENT DOCUMENTS 6,101,456 A    8/2000    Kowatari et al.
2011/0167811 A1*   7/2011    Kawaguchi ........... F02D 41/021
                                                                                                               60/395
(Continued)

FOREIGN PATENT DOCUMENTS

JP        8-302755 A    11/1996
JP     2009-293428 A    12/2009
(Continued)

OTHER PUBLICATIONS

International Search Report (PCT/ISA/210) issued in PCT Application No. PCT/JP2018/0064246 dated Apr. 17, 2018 with English translation (two (2) pages).
(Continued)

*Primary Examiner* — Darlene P Condra
(74) *Attorney, Agent, or Firm* — Crowell & Moring LLP

(57) ABSTRACT

A hydraulic excavator (1) includes a hydraulic pump (22) driven by an engine (20), an electromagnetic proportional valve (24) for hydraulic pump that adjusts pump torque of the hydraulic pump (22) in response to a pump torque target value (Tp), a hydraulic actuator operated by a delivery pressure of the hydraulic pump (22), a motor generator (30) connected to the engine (20), and a controller (26) configured to calculate the pump torque target value (Tp). The controller (26) acquires a pump torque adjustment amount (Qadj) based on a deviation (ΔAH) between a current integrating value (AH1) acquired by integrating a value of a
(Continued)

current flowing into the motor generator (30) when the hydraulic actuator is driven and a current integrating reference value (AH0).

5 Claims, 12 Drawing Sheets

(51) Int. Cl.
| | | |
|---|---|---|
| B60K 6/485 | (2007.10) | |
| E02F 3/42 | (2006.01) | |
| F04B 49/06 | (2006.01) | |
| F15B 11/16 | (2006.01) | |
| B60K 6/36 | (2007.10) | |
| B60W 10/10 | (2012.01) | |
| B60W 20/00 | (2016.01) | |
| F04B 35/00 | (2006.01) | |
| E02F 9/20 | (2006.01) | |

(52) U.S. Cl.
CPC .............. *B60W 20/00* (2013.01); *E02F 3/425* (2013.01); *E02F 3/435* (2013.01); *E02F 9/20* (2013.01); *E02F 9/22* (2013.01); *E02F 9/2271* (2013.01); *E02F 9/2296* (2013.01); *F04B 35/002* (2013.01); *F04B 49/06* (2013.01); *F04B 49/065* (2013.01); *F15B 11/16* (2013.01); *B60Y 2200/92* (2013.01); *F15B 2211/20523* (2013.01); *F15B 2211/6651* (2013.01); *Y02T 10/62* (2013.01)

(58) Field of Classification Search
CPC ........ E02F 9/2296; E02F 9/2075; B60K 6/36; B60K 6/485; B60W 10/10; B60W 20/00; F04B 35/002; F04B 49/06; F04B 49/065; F15B 11/16; F15B 2211/20523; F15B 2211/6651; F15B 2211/633; F15B 2211/20515; F15B 2211/20546; F15B 2211/6652; F15B 2211/6655; Y02T 10/6226; B60Y 2200/92

See application file for complete search history.

(56) References Cited

U.S. PATENT DOCUMENTS

| | | | | |
|---|---|---|---|---|
| 2011/0313608 | A1* | 12/2011 | Izumi ................... | E02F 9/2075 701/22 |
| 2012/0185141 | A1 | 7/2012 | Kamado et al. | |
| 2013/0317684 | A1* | 11/2013 | Kaneko ................ | E02F 9/2079 701/22 |
| 2014/0163804 | A1* | 6/2014 | Kaneko ................ | E02F 9/2075 701/22 |
| 2015/0081147 | A1* | 3/2015 | Kawaguchi ............ | B60L 50/16 701/22 |
| 2016/0138245 | A1* | 5/2016 | Moki .................... | B60K 6/485 290/50 |
| 2016/0215480 | A1* | 7/2016 | Ishihara ................. | E02F 3/32 |
| 2016/0222631 | A1* | 8/2016 | Kohno ................. | E02F 9/0866 |
| 2017/0320483 | A1* | 11/2017 | Ishihara ................ | B60W 20/16 |

FOREIGN PATENT DOCUMENTS

| | | |
|---|---|---|
| JP | 2013-40487 A | 2/2013 |
| JP | 2016-53282 A | 4/2016 |
| WO | WO 2011/145715 A1 | 11/2011 |

OTHER PUBLICATIONS

Japanese-language Written Opinion (PCT/ISA/237) issued in PCT Application No. PCT/JP2018/0064246 dated Apr. 17, 2018 (three (3) pages).

* cited by examiner

CONSTRUCTION MACHINE

TECHNICAL FIELD

The present invention relates to a construction machine capable of correcting pump torque of a hydraulic pump.

BACKGROUND ART

In general, a construction machine includes an engine that is a power source, a hydraulic pump that is driven by the engine, a hydraulic pump regulator that controls a tilting angle of the hydraulic pump, and hydraulic actuators such as hydraulic motors, and hydraulic cylinders that are actuated by a delivery pressure of the hydraulic pump. In this case, the hydraulic pump regulator is controlled by a controller via an electromagnetic proportional valve. The controller derives a pump torque target value based on an operation amount of a control lever, a pressure of the hydraulic pump, an engine rotational speed and the like. The controller converts the pump torque target value into a current value command to drive the electromagnetic proportional valve of the hydraulic pump regulator. Thereby, the controller determines the output of the hydraulic pump.

Meanwhile, manufacturing variations due to individual differences exist in the engine and the hydraulic pump, and a difference occurs in engine output or hydraulic pump output depending on the machine. When the output characteristic of the machine without a tolerance is used as a reference, in the machine with a combination of engine output lower than the reference and hydraulic pump output higher than the reference, there is also a possibility of an engine stall being caused at the time of working under heavy load in addition to a possibility with the working amount decreasing, as compared with the machine without a tolerance.

Therefore, there is known a pump torque correcting device that corrects a hydraulic pump output in order to suppress variations in hydraulic pump output (Patent Document 1). The pump torque correcting device finds a deviation between an actual pump torque pressure measured by a pressure measuring device and a pump torque target value, and corrects the pump torque target value based on the deviation.

PRIOR ART DOCUMENT

Patent Document

Patent Document 1: Japanese Patent Laid-Open No. 2009-293428 A

SUMMARY OF THE INVENTION

However, in the pump torque correcting device described in Patent Document 1, a pressure measuring device for measuring an actual pump torque pressure needs to be attached when correction of the pump torque is carried out. Therefore, there occurs a problem that the time required to complete the correction of the pump torque including an attaching work becomes long, in addition to the attaching work of the pressure measuring device being troublesome. A calibration work such as the correction work of the pump torque is assumed to be carried out in the previous stage of the performance test that is mainly performed after machine assembly. Therefore, considering a tact time of the manufacture line, reduction in the working time is further required.

Further, there is known a hybrid construction machine using both an engine and an electric motor for the power source, as construction machines. In such a hybrid construction machine, an insufficient amount of the engine output is compensated by driving the electric motor by energy stored in the electricity storage device, so that a remaining amount of energy of the electricity storage device gives an influence on the hydraulic pump output. Therefore, when the correction of the pump torque is performed without considering the drive characteristic of the electric motor as in the pump torque correction device described in Patent Document 1, there arises a problem of being incapable of sufficiently acquiring the effect of suppressing variations in the hydraulic pump output.

The present invention is made in view of the above-mentioned problems in the conventional technology, and an object of the present invention is to provide a construction machine that can enhance workability concerning correction of pump torque.

For solving the above-mentioned problems, the present invention is applied to a construction machine comprising: a hydraulic pump that is driven by an engine; a pump torque adjustment device to adjust pump torque of the hydraulic pump in response to a pump torque target value; a hydraulic actuator to be operated by delivery pressure of the hydraulic pump; a motor generator connected to the engine; an inverter and an electricity storage device configured to drive the motor generator; and a controller configured to calculate the pump torque target value.

The present invention is characterized in that the controller includes an index acquiring section configured to acquire at least anyone of a current integrating value acquired by integrating a current value of a current flowing to the motor generator from the electricity storage device, and a charging rate reduction amount of the electricity storage device, as an index, and acquires a pump torque adjustment amount for correcting the pump torque target value, based on a deviation between the index acquired by the index acquiring section when the hydraulic actuator is driven, and an index reference value acquired by measuring the index in advance by using an engine and a hydraulic pump which are references.

According to the present invention, the controller acquires the pump torque adjustment amount with at least one of the current integrating value acquired by integrating the current value of the current flowing into the motor generator from the electricity storage device when the hydraulic actuator is driven, and the charging rate reduction amount of the electricity storage device, as the index. Therefore, it is not necessary to attach a special device such as the pressure measuring device, in order to find the pump torque correction amount. In addition to this, the pump torque correction amount can be acquired by only operating the hydraulic actuator for a short time, which therefore makes it possible to contribute also to a reduction in working time.

MODE FOR CARRYING OUT THE INVENTION

Hereinafter, construction machines of embodiments in the present invention will be in detail explained with reference to the accompanying drawings, with an example of application of each to a hybrid type hydraulic excavator.

Figure 1:
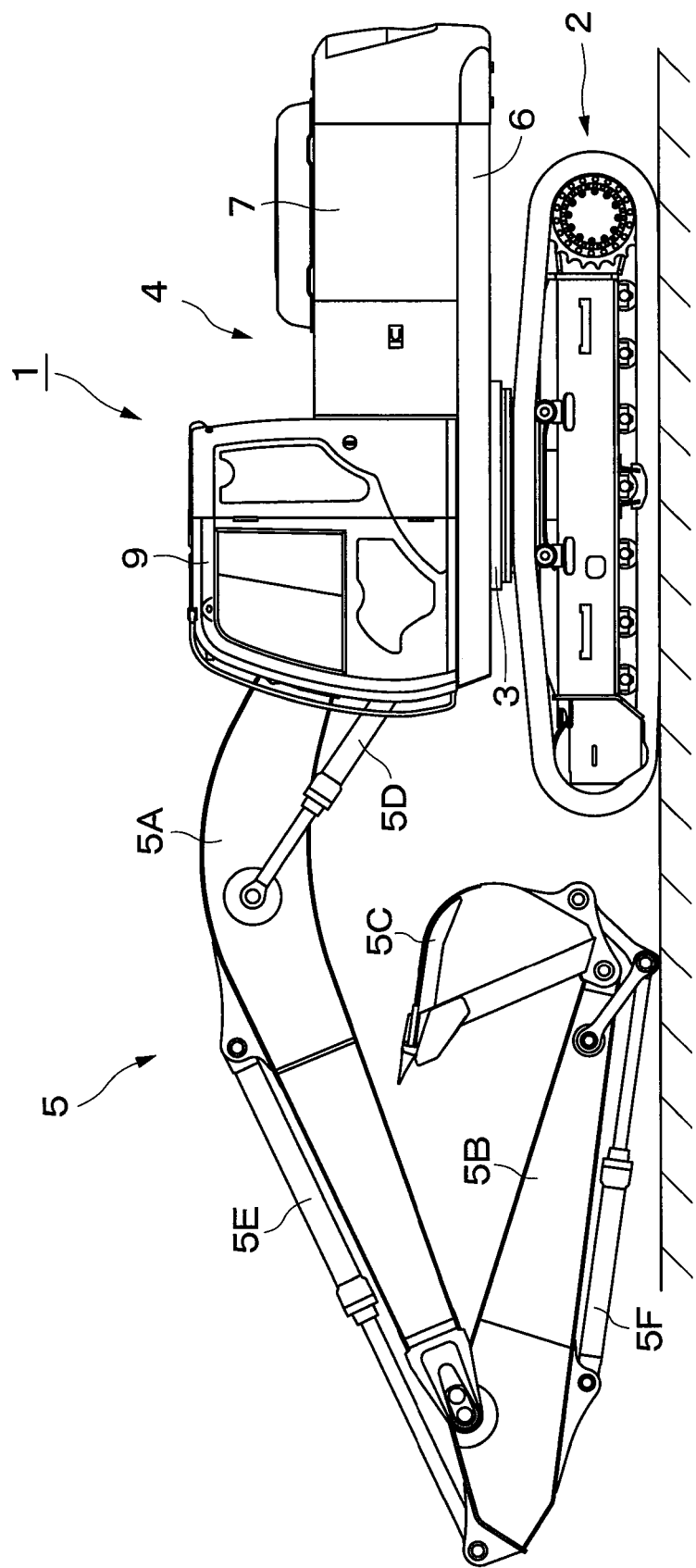
FIG. 1 is a front view showing a hydraulic excavator according to a first embodiment of the present invention.
Figure 2:
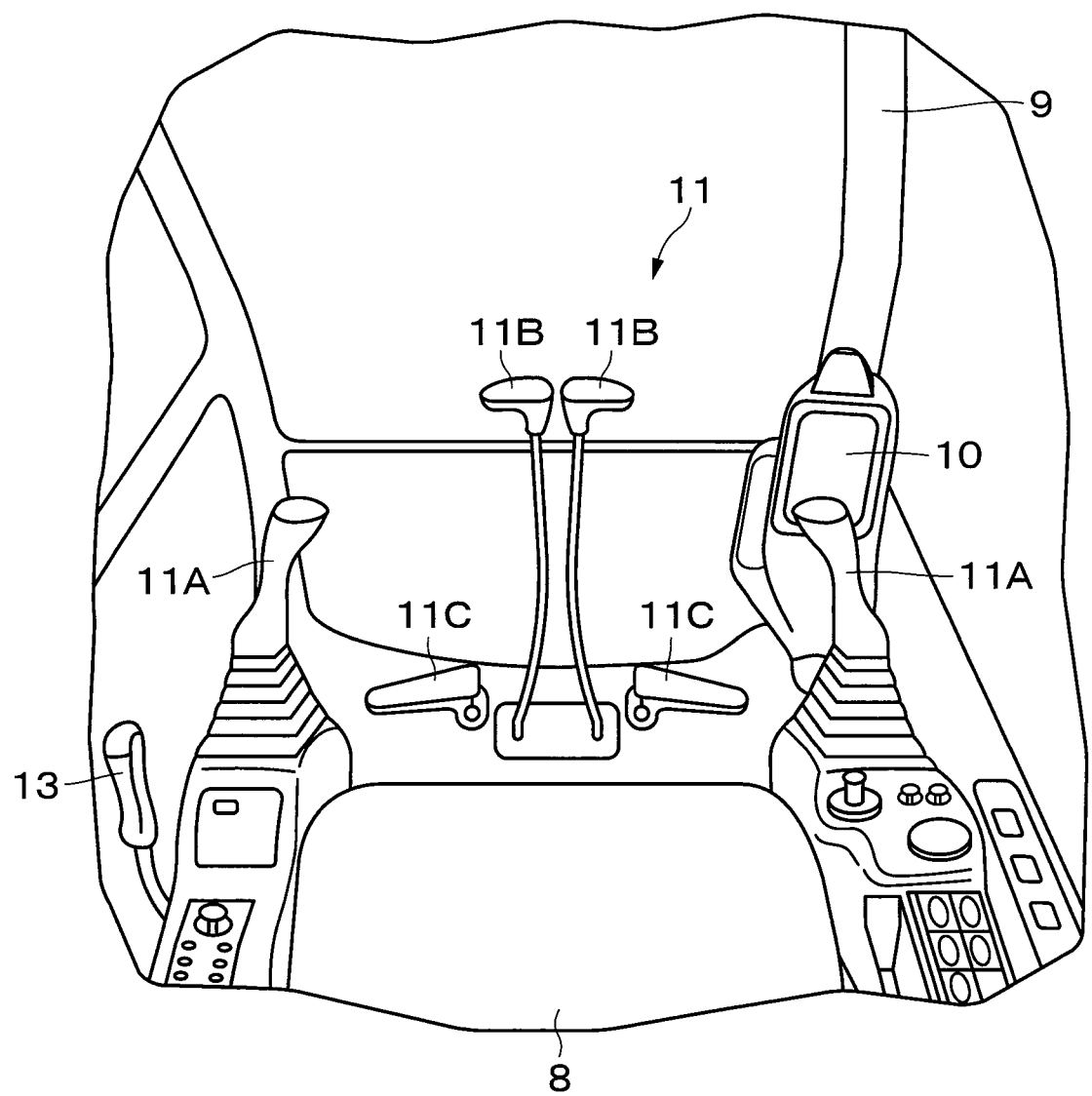
FIG. 2 is an essential part perspective view showing an inside of a cab in FIG. 1.

Here, FIG. 1 to FIG. 12 show a first embodiment of the present invention. As shown in FIG. 1 and FIG. 2, an hydraulic excavator 1 includes an automotive lower traveling structure 2 of a crawler type, an upper revolving structure 4 that is mounted to be capable of revolving on the lower traveling structure 2 as moving means through the revolving device 3, and a working mechanism 5 of an articulated structure that is disposed in the front side of the upper revolving structure 4 to perform excavating work and the like. The lower traveling structure 2 includes a hydraulic motor 2A for performing a traveling operation. The revolving device 3 includes a hydraulic motor 3A for performing a revolving operation. It should be noted that although the lower traveling structure 2 of a crawler type is shown as an example, the lower traveling structure 2 may be of a wheel type.

The upper revolving structure 4 includes a housing cover 7 provided on a revolving frame 6 and accommodates an engine 20 and the like, and a cab 9 internally accommodating an operator's seat 8. A monitor device 10 is located in front of the operator's seat 8 and is provided in the cab 9. The monitor device 10 receives a signal from a controller 26, and displays operation information of the machine. The monitor device 10 may include an input device such as a button and a touch panel and the like. In this case, various kinds of processing of the controller 26 may be operated by the monitor device 10. An operation device 11 is composed of, for example, control levers and operation pedals, which are located around the operator's seat 8 and provided in the cab 9. An engine control dial 12 is to set a target rotational speed of the engine 20, and is provided in the cab 9.

The working mechanism 5 is a front actuator mechanism. The working mechanism 5 is composed of, for example, a boom 5A, an arm 5B and a bucket 5C, a boom cylinder 5D, an arm cylinder 5E and a bucket cylinder 5F that drive the boom 5A, the arm 5B and the bucket 5C. The working mechanism 5 is mounted to the revolving frame 6 and extends and contracts the cylinders 5D to 5F, thereby performing lowering and rising operations. It should be noted that FIG. 1 shows a case of using the bucket 5C, but various attachments such as a breaker other than the bucket 5C may be used.

As shown in FIG. 2, the operation device 11 includes control levers 11A for working and revolving which are provided at both sides of the operator's seat 8 in the cab 9, for example. These control levers 11A perform a driving operation of the working mechanism 5 and a revolving operation of the revolving device 3 by being operated to tilt in any direction. Further, the operation device 11 also includes control levers 11B and operating pedals 11C that are located at a front side of the operator's seat 8 to perform a traveling operation of the lower traveling structure 2.

A gate lock lever 13 is located closer to an outlet/inlet side of the cab 9 than the operator's seat 8, and is provided in the cab 9. Specifically, the gate lock lever 13 is disposed at a left side of the operator's seat 8. The gate lock lever 13 is capable of being operated to tilt in an upper-lower direction. A state where the gate lock lever 13 is raised is a locked state, which is a state where a vehicle body is incapable of moving even when the operation device 11 is tilted while the engine is operated. Meanwhile, when the gate lock lever 13 is lowered while the engine is operated, an operation of the vehicle body is made possible.

Next, an explanation will be made of the configuration of a hydraulic system that controls an operation of the working mechanism 5 and the like which are mounted on the hydraulic excavator 1, with reference to FIG. 3.

The engine 20 is mounted on the revolving frame 6. The engine 20 is configured of an internal combustion engine such as a diesel engine and the like, for example. A hydraulic pump 22 and a motor generator 30 are mechanically connected in series to an output side of the engine 20, and the hydraulic pump 22 and the motor generator 30 are driven by the engine 20. The engine 20 includes a rotational sensor 20A that detects an engine rotational speed $\omega e$.

Here, an operation of the engine 20 is controlled by an engine control unit 21 (hereinafter, referred to as an ECU 21). The ECU 21 is configured by a microcomputer, for example. The ECU 21 controls output torque, a rotational speed (engine rotational speed) and the like of the engine 20 based on an engine output command from the controller 26. Further, the ECU 21 is connected to the rotational sensor 20A. The ECU 21 outputs the engine rotational speed $\omega e$ detected by the rotational sensor 20A to the controller 26. It should be noted that a maximum output of the engine 20 is smaller than maximum power of the hydraulic pump 22, for example.

The hydraulic pump 22 is mechanically connected to the engine 20. The hydraulic pump 22 is drivable by torque of only the engine 20. Further, the hydraulic pump 22 is also drivable by compound torque (total torque) acquired by adding assist torque of the motor generator 30 to the torque of the engine 20. The hydraulic pump 22 pressurizes hydraulic oil stored in a tank (not shown), and delivers the hydraulic oil to the hydraulic motor 2A of the lower traveling structure 2, the hydraulic motor 3A of the revolving device 3, and the cylinders 5D to 5F of the working mechanism 5 as the pressurized oil. At this time, the hydraulic motor 2A for traveling, the hydraulic motor 3A for revolving and the cylinders 5D to 5F for working configure a hydraulic actuator. The hydraulic motor 2A for traveling, the hydraulic motor 3A for revolving and the cylinders 5D to 5F for working are operated by delivery pressure of the hydraulic pump 22.

The hydraulic pump 22 is configured of a swash plate type or inclined shaft type variable displacement hydraulic pump, for example, and has a capacity adjustable in response to a tilt angle of a swash plate or an inclined shaft. A hydraulic pump regulator 23 is a tilt control actuator that controls a tilt angle of a swash plate or the like, and is provided in the hydraulic pump 22. Moreover, the hydraulic pump 22 is provided with a temperature sensor (not shown) that detects a hydraulic oil temperature. The hydraulic oil temperature detected by the temperature sensor is inputted to the controller 26.

An electromagnetic proportional valve 24 for hydraulic pump configures a pump torque adjusting device. The electromagnetic proportional valve 24 for hydraulic pump drives the hydraulic pump regulator 23 in response to a pump torque target value Tp from the controller 26, and changes the tilt angle of the hydraulic pump 22. Thereby, the electromagnetic proportional valve 24 for hydraulic pump adjusts a maximum pump torque of the hydraulic pump 22.

The hydraulic pump 22 is connected to the hydraulic motors 2A and 3A and cylinders 5D to 5F through a control valve 25. These hydraulic motors 2A and 3A and cylinders 5D to 5F are driven by the pressurized oil from the hydraulic pump 22. The control valve 25 supplies or discharge the pressurized oil delivered from the hydraulic pump 22 to or from the hydraulic motors 2A and 3A and the cylinders 5D to 5F in response to the operation to the operation device 11.

The controller 26 is configured by a microcomputer, for example. The controller 26 calculates a target rotational speed of the engine 20 and the pump torque target value Tp, based on an operating amount OA of the operation device 11, an adjusting amount of an engine control dial 12 capable of adjusting the vehicle body output, pressure values or the like measured from the hydraulic pump 22 and the hydraulic actuator. The target rotational speed is outputted (transmitted) to the ECU 21. The ECU 21 controls a fuel injection amount of the engine 20 in accordance with the target rotational speed. The pump torque target value Tp is converted into a current Indicating value, which excites the electromagnetic proportional valve 24 for hydraulic pump to drive the hydraulic pump regulator 23. Thereby, the hydraulic pump regulator 23 changes the tilt angle of the hydraulic pump 22 to control the maximum pump torque of the hydraulic pump 22.

Figure 4:
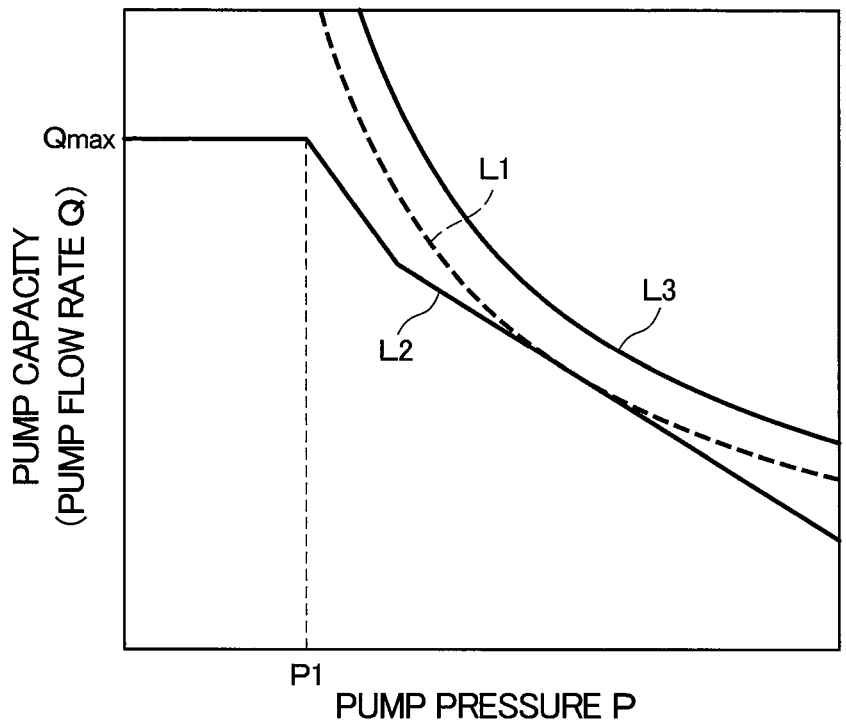
FIG. 4 is a characteristic line diagram showing a relation between a pump pressure and a pump capacity.
Figure 5:
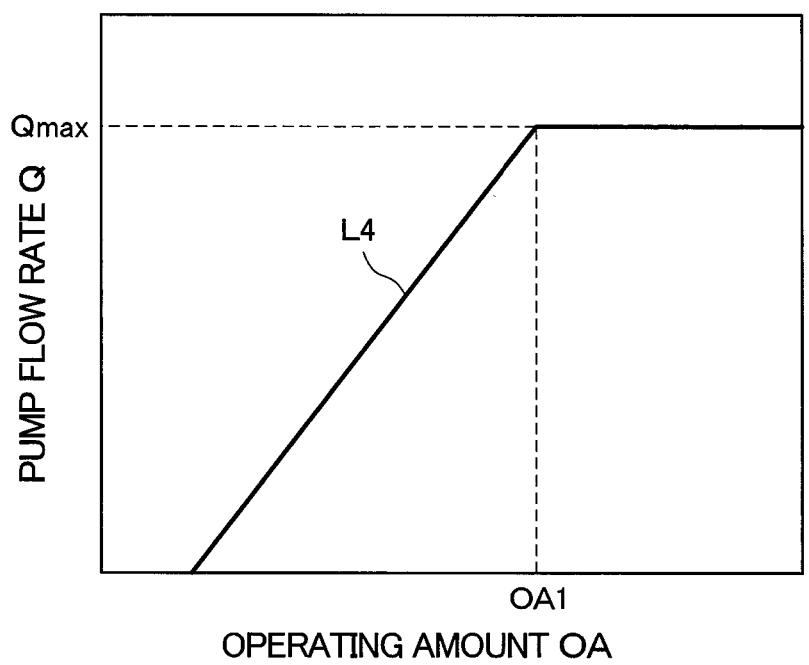
FIG. 5 is a characteristic line diagram showing a relation between an operating amount of an operation device and a pump flow rate.

FIG. 4 shows a P-Q characteristic line diagram of the hydraulic system. FIG. 5 shows a relation between the operating amount OA of the operation device 11 and a pump flow rate Q. The output of the hydraulic pump 22 is expressed by a product of a pump pressure P and the pump flow rate Q (output=P×Q). In general, for an output characteristic of the hydraulic pump 22, an approximate characteristic L2 which is approximated to an ideal curve L1 is set (refer to FIG. 4). That is, the hydraulic excavator 1 according to the present embodiment has a characteristic shown by a PQ line diagram that is a relation of a pump delivery pressure and a displacement volume shown in FIG. 4, that is, a relation of the pump delivery pressure (pump pressure P) and the flow rate Q corresponding to the displacement volume, as the basic characteristic.

At this time, when the pump pressure P is lower than a predetermined specified pump pressure value P1, the hydraulic pump 22 feeds a maximum pump flow rate Qmax. In contrast to this, when the pump pressure P approaches the pump pressure value P1 or more, the hydraulic pump 22 has the pump flow rate Q limited in accordance with the approximate characteristic L2. Thereby, the hydraulic pump 22 has the pump output limited within a range without exceeding an engine output characteristic L3. At this time, the pump flow rate Q of the hydraulic pump 22 is mainly determined based on the operating amount OA (lever operating amount) of the operation device 11. Therefore, as in a characteristic line L4 in FIG. 5, the pump flow rate Q required of the hydraulic pump 22 increases with an increase in the operating amount OA of the operation device 11. At this time, when the operating amount OA is larger than a predetermined specified operating amount OA1, the maximum pump flow rate Qmax is required.

Figure 6:
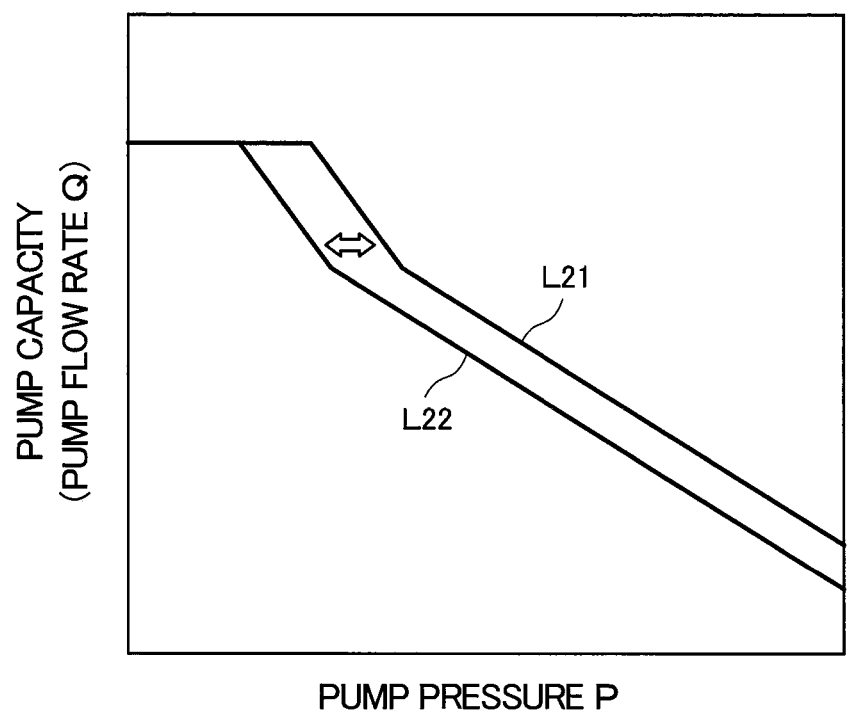
FIG. 6 is an explanatory view showing a PQ line diagram moving characteristic.

Further, as shown in FIG. 6, the hydraulic excavator 1 has the PQ line diagram moving characteristic as the basic characteristic. A characteristic line L21 in FIG. 6 is a PQ line diagram corresponding to a maximum pump torque based on the target rotational speed of the engine 20. On the other hand, a characteristic line L22 in FIG. 6 is a PQ line diagram corresponding to a pump torque by low torque control lower than the maximum pump torque, for example, a minimum pump torque. A characteristic of the hydraulic system is movable between the PQ line diagram (characteristic line L21) corresponding to the maximum pump torque, and the PQ line diagram (characteristic line L22) corresponding to the minimum pump torque, in response to the pump torque target value Tp.

Figure 7:
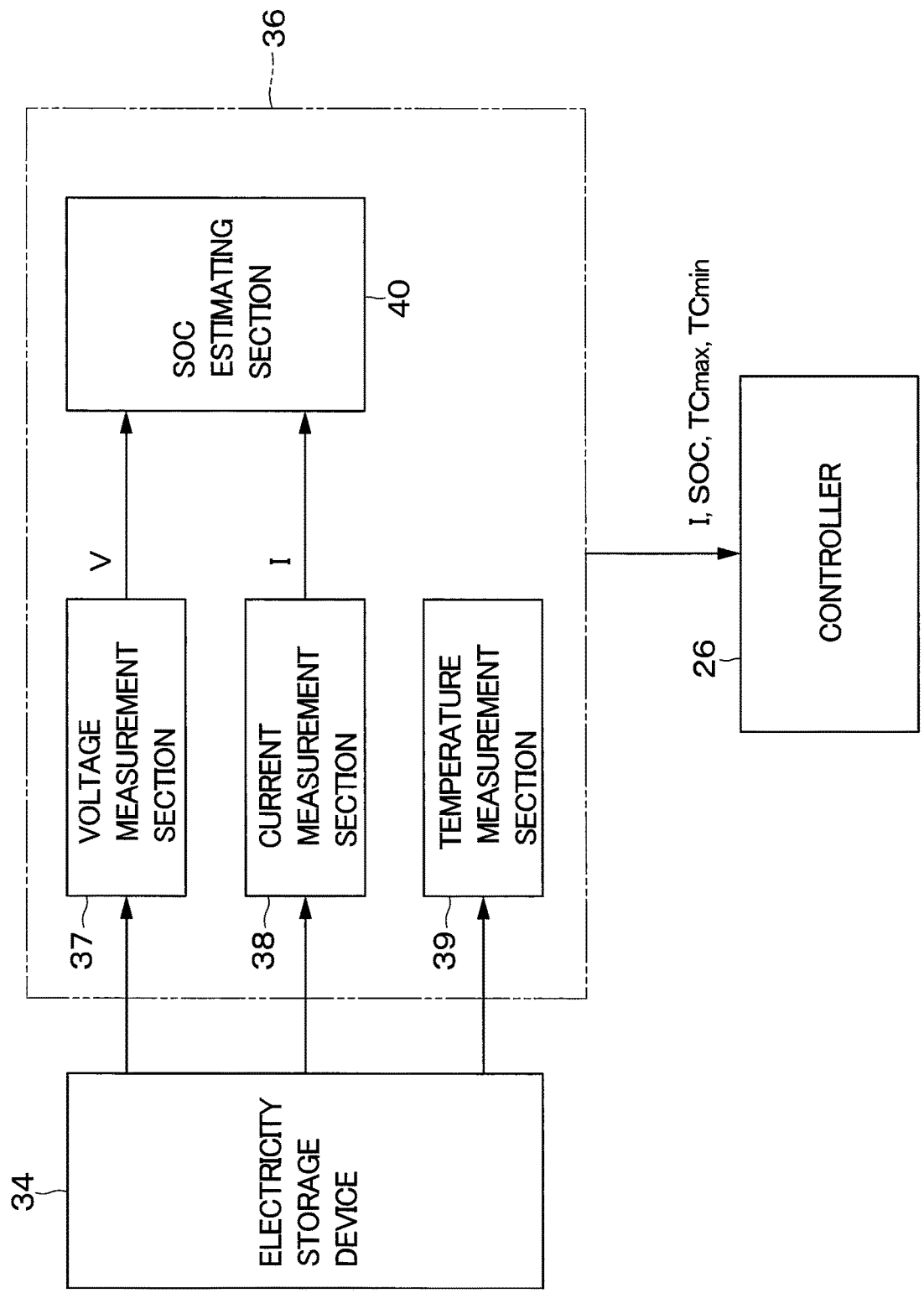
FIG. 7 is a block diagram showing the configuration of a battery control unit.

Next, an explanation will be made of the configuration of an electric system that controls the motor generator 30 and the like, which is mounted on the hydraulic excavator 1 with reference to FIG. 3 and FIG. 7.

Figure 3:
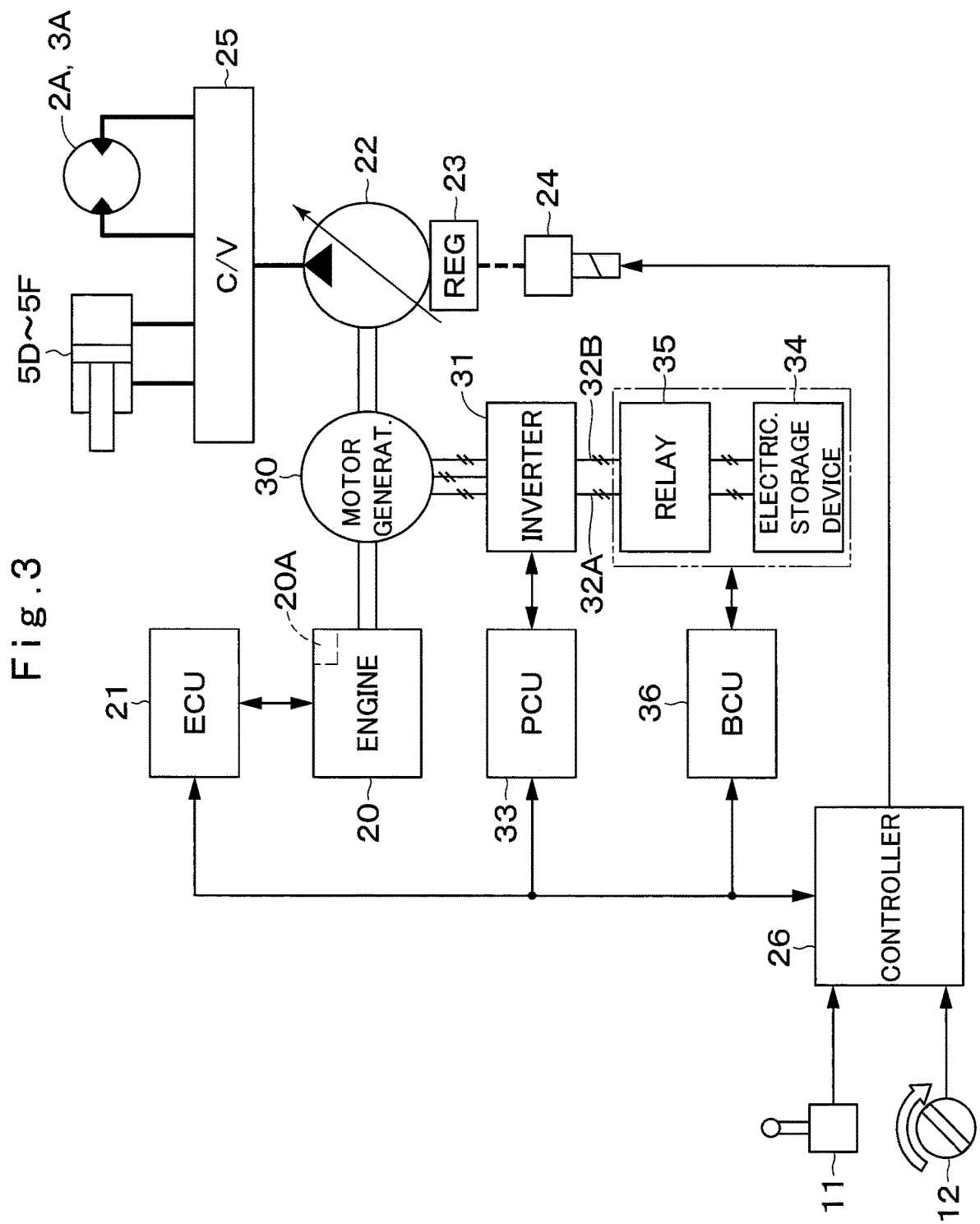
FIG. 3 is a block diagram showing a hydraulic system and an electric system that are applied to the hydraulic excavator in FIG. 1.

As shown in FIG. 3, the motor generator 30 (motor generator) is mechanically connected to the engine 20. The motor generator 30 is configured of, for example, a synchronous motor or the like. The motor generator 30 serves two functions of power generation for performing power supply to an electricity storage device 34 by working as a generator with the engine 20 as a power source, and of power running for assisting in a drive of the engine 20 and the hydraulic pump 22 by working as the motor with power from the electricity storage device 34 as the power source. Accordingly, an assist torque of the motor generator 30 is added to the torque of the engine 20 in accordance with the situation, and the hydraulic pump 22 is driven by these torques. By the pressurized oil delivered from the hydraulic pump 22, the operation of the working mechanism 5, the travel of the vehicle and the like are performed.

The motor generator 30 is connected to a pair of DC buses 32A and 32B through an inverter 31. The inverter 31 is configured by using a plurality of switching elements composed of a transistor, an insulating gate bipolar transistor (IGBT) and the like, for example. The inverter 31 controls the motor generator 30. In the inverter 31, on/off operations of the respective switching elements are controlled by a power control unit 33 (hereinafter, referred to as a PCU 33). The PCU 33 is configured by a microcomputer, for example.

At the time of power generation of the motor generator 30, the inverter 31 converts AC power from the motor generator 30 into DC power and supplies the DC power to the electricity storage device 34. At the time of power running of the motor generator 30, the inverter 31 converts the DC power of the DC buses 32A and 32B into AC power and supplies the AC power to the motor generator 30. Then, the PCU 33 controls the on/off operations of the respective switching elements of the inverter 31 based on a command of power generation or assist from the controller 26.

Thereby, the PCU 33 controls generated power at the time of power generation and the drive power at the time of power running of the motor generator 30.

The electricity storage device 34 is electrically connected to the inverter 31 and the motor generator 30 through a relay 35. The electricity storage device 34 is configured by a plurality of cells (not shown) composed of lithium ion batteries, for example, and is connected to the DC buses 32A and 32B. The relay 35 electrically connects or cuts off the electricity storage device 34 and the inverter 31. The electricity storage device 34 is charged by generated power of the motor generator 30 at the time of power generation of the motor generator 30. The electricity storage device 34 supplies drive power to the motor generator 30 at the time of power running of the motor generator 30.

A battery control unit 36 (hereinafter, referred to as a BCU 36) controls the electricity storage device 34 and the relay 35. The BCU 36 is configured by a microcomputer, for example, and configures an electricity storage device state detecting section that detects a state of the electricity storage device 34. As shown in FIG. 7, the BCU 36 includes a voltage measurement section 37, a current measurement section 38, a temperature measurement section 39, and a SOC estimating section 40. The voltage measurement section 37 measures voltages of the cells mounted on the electricity storage device 34. The voltage measurement section 37 calculates, for example, a maximum (highest) cell voltage, a minimum (lowest) cell voltage, a total voltage of all the cells and the like, based on the voltages of the respective cells which are measured.

The current measurement section 38 measures a current I flowing in the cells. That is, the current measurement section 38 measures the current I that is transferred between the electricity storage device 34 and the motor generator 30. The temperature measurement section 39 measures temperatures of the respective cells. The BCU 36 acquires a maximum (highest) cell temperature TCmax, and a minimum (lowest) cell temperature TCmin, for example, based on the temperatures of the respective cells measured by the temperature measurement section 39. Various voltages V (the maximum cell voltage, the minimum cell voltage, the total voltage of all the cells) detected by the voltage measurement section 37, and the current I measured by the current measurement section 38 are inputted to an SOC estimating section 40. The SOC estimating section 40 estimates a state of charge SOC (charging rate) of the electricity storage device 34, based on the voltages V and current I. Therefore, the SOC estimating section 40 serves as a charging rate calculating section that calculates the state of charge SOC (charging rate) of the electricity storage device 34. At this time, the state of charge SOC has a value corresponding to an electricity storage amount of the electricity storage device 34. The BCU 36 outputs (transmits) the current I, the state of charge SOC, the maximum cell temperature TCmax, the minimum cell temperature TCmin and the like to the controller 26.

Figure 8:
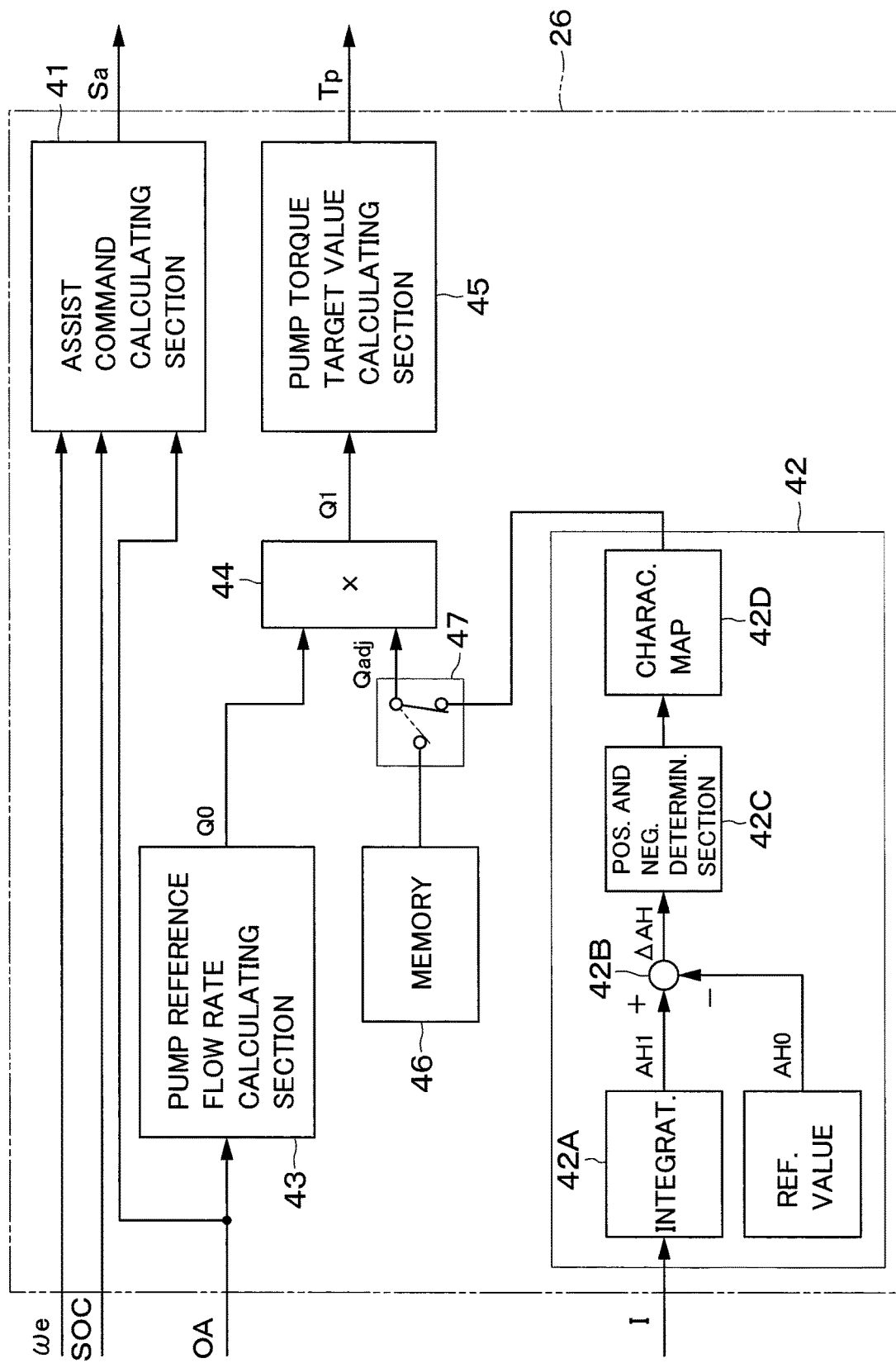
FIG. 8 is a block diagram showing the configuration of a part relating to pump torque correction, with respect to a controller according to the first embodiment.

Next, an explanation will be made of correction processing of the pump torque by the controller 26 with reference to FIG. 8. FIG. 8 shows a functional block diagram of apart that performs pump torque correction, with respect to the controller 26.

The controller 26 includes an assist command calculating section 41. Further, the controller 26 includes a pump torque correction calculating section 42, a pump reference flow rate calculating section 43, a multiplier 44, and a pump torque target value calculating section 45. Further, the controller 26 includes a memory 46 and a switch 47.

The assist command calculating section 41 calculates an assist command Sa for causing the motor generator 30 to perform assist operation based on the operating amount OA of the operation device 11, the driving state of the engine 20, and the state of charge SOC. Therefore, the operating amount OA of the operation device 11, the engine rotational speed $\omega e$ and the state of charge SOC are inputted to the assist command calculating section 41. The assist command calculating section 41 calculates a required torque required of the vehicle body based on the operating amount OA of the operation device 11 and the state of charge SOC. The assist command calculating section 41 calculates an engine torque generated by the engine 20 based on the engine rotational speed $\omega e$. The assist command calculating section 41 calculates an assist torque in response to a difference between the required torque and the engine torque, when the engine torque is smaller than the required torque, that is, when the engine torque is insufficient with respect to the required torque. The assist command calculating section 41 outputs an assist command Sa corresponding to the assist torque to the PCU 33 to supply a current corresponding to the assist torque to the motor generator 30. Thereby, the PCU 33 controls the inverter 31 in response to the assist command Sa, and generates the assist torque by the motor generator 30.

It should be noted that the assist command calculating section 41 may calculate the assist command Sa by also considering the state (the voltage, the current) of the electricity storage device 34, for example, without being limited to the operating amount OA of the operation device 11, the drive state of the engine 20 and the state of charge SOC.

The pump torque correction calculating section 42 calculates a pump torque adjustment amount Qadj based on the current I flowing into the motor generator 30 from the electricity storage device 34. The pump torque correction calculating section 42 is executed when pump output is corrected with respect to the hydraulic excavator 1 on which the hydraulic pump 22 having a tolerance, for example, is mounted. The pump torque correction calculating section 42 has an integrator 42A, a deviation calculating section 42B, a positive and negative determination section 42C and a characteristic map 42D.

The integrator 42A integrates a current value flowing into the electricity storage device 34 for a specified time (for example, for several seconds), and acquires a current integrating value AH1. At this time, the integrator 42A serves as an index acquiring section that integrates the current value of the current I flowing into the motor generator 30 that is measured by the current measurement section 38 when the hydraulic actuator (hydraulic motors 2A and 3A, the cylinders 5D to 5F) drives, and acquires the current integrating value AH1 as an index. The deviation calculating section 42B subtracts a reference value AH0 (current integrating reference value AH0) from the measured current integrating value AH1, and acquires a deviation $\Delta$AH between the measured current integrating value AH1 and the reference value AH0.

Here, the reference value AH0 is a current integrating value as an index reference value measured in advance, in the machine on which the engine 20 and the hydraulic pump 22 which are references are mounted. Specifically, the current integrating value is measured in advance, in the machine on which the engine 20 and the hydraulic pump 22 which are calibrated and have no tolerance are mounted. The current integrating value is the reference value AH0, and the reference value AH0 is stored in the controller 26 as a control parameter.

The positive and negative determination section 42C determines whether the vehicle body output is high or low to the machine which is the reference, based on the deviation ΔAH which is outputted from the deviation calculating section 42B. The characteristic map 42D acquires the pump torque adjustment amount Qadj from the deviation ΔAH with a determination result of the positive and negative determination section 42C taken into consideration. When the result of the deviation ΔAH is negative, the vehicle body output is lower than the reference, so that the characteristic map 42D acquires such a pump torque adjustment amount Qadj as to increase the pump output. At this time, the pump torque adjustment amount Qadj is a value larger than one, for example (Qadj>1). When the result of the deviation ΔAH is positive on the other hand, the vehicle output is higher than the reference, so that the characteristic map 42D acquires such a pump torque adjustment amount Qadj as to limit the pump output. At this time, the pump torque adjustment amount Qadj is a value smaller than one, for example (Qadj<1).

It should be noted that when the operating amount OA of the operation device 11 is larger than a specified value (for example, at the time of the maximum operating amount), the required torque for the vehicle body exceeds the engine torque. At this time, power assist by the motor generator 30 is started, and energy (current) required for power assist is supplied to the motor generator 30 from the electricity storage device 34. On the other hand, when the operating amount OA of the operation device 11 is smaller than a specified amount, the required torque for the vehicle body falls below the engine torque, and therefore the power assist is not executed. Thus, in a state where the power assist is executed, the pump torque correction calculating section 42 executes calculating processing of the pump torque adjustment amount Qadj.

The pump reference flow rate calculating section 43 acquires a pump flow rate Q0 (hereinafter, referred to as a required pump flow rate Q0) that is required in response to the operating amount OA of the operation device 11, as a pump reference flow rate. Specifically, when the operating amount OA of the operation device 11 is large, the pump reference flow rate calculating section 43 increases the required pump flow rate Q0 in response to the operating amount OA. When the operating amount OA of the operation device 11 is small, the pump reference flow rate calculating section 43 decreases the required pump flow rate Q0 in response to the operating amount OA.

The multiplier 44 configures a correction calculating section that performs correction calculation based on the pump torque adjustment amount Qadj to the required pump flow rate Q0. Specifically, the multiplier 44 multiplies the required pump flow rate Q0 by the pump torque adjustment amount Qadj acquired in the pump torque correction calculating section 42. Thereby, the multiplier 44 adjusts the pump flow rate Q1 based on the pump torque adjustment amount Qadj.

The pump torque target value calculating section 45 converts the pump flow rate Q1 after adjustment into the pump torque target value Tp. The pump torque target value calculating section 45 outputs the pump torque target value Tp to the electromagnetic proportional valve 24 for hydraulic pump. According to the configuration like this, correction of the hydraulic pump output can be carried out by only performing a lever operation for several seconds, and efficiency of the correction work can be enhanced.

It should be noted that as the correction calculation, the controller 26 multiplies the required pump flow rate Q0 for calculating the pump torque target value Tp by the pump torque adjustment amount Qadj. The present invention is not limited to this, but the controller 26 may perform correction calculation (multiplication, for example) based on the pump torque adjustment amount Qadj after acquiring the pump torque target value Tp, for example. Further, the controller 26 may perform correction calculation by adding or subtracting the value corresponding to the pump torque adjustment amount, with respect to the required pump flow rate Q0 or the pump torque target value Tp.

The memory 46 stores the pump torque adjustment amount Qadj calculated by the pump torque correction calculating section 42. The memory 46 is configured by, for example, a nonvolatile memory or the like. When the pump torque correction calculating section 42 executes correction calculation, and the pump torque adjustment amount Qadj is calculated, the memory 46 stores the newly calculated pump torque adjustment amount Qadj.

The switch 47 selects the pump torque adjustment amount Qadj of any one of the memory 46 and the pump torque correction calculating section 42. When the pump torque adjustment amount Qadj is calculated immediately after machine assembly, for example, the switch 47 selects the pump torque adjustment amount Qadj calculated by the pump torque correction calculating section 42, and inputs the pump torque adjustment amount Qadj to the multiplier 44. On the other hand, after the calculation of the pump torque adjustment amount Qadj is finished, and the pump torque adjustment amount Qadj is stored in the memory 46, the switch 47 selects the pump torque adjustment amount Qadj stored in the memory 46 and inputs the pump torque adjustment amount Qadj to the multiplier 44. That is, at the shipment time and the maintenance time of the vehicle body, the switch 47 selects the pump torque adjustment amount Qadj calculated by the pump torque correction calculating section 42. At a normal operation time other than the above, the switch 47 selects the pump torque adjustment amount Qadj stored in the memory 46.

Next, an explanation will be made of a case of executing calculation processing of the pump torque adjustment amount Qadj by an external command, with reference to FIG. 9.

A working situation in which the calculation processing of the pump torque adjustment amount Qadj is executed is assumed to be immediately after machine assembly, for example. The operator accesses the controller 26 mounted on the hydraulic excavator 1 from a computer 50 (hereinafter, referred to as a PC 50) as the exterior device, and starts preparation of a work for executing the calculation processing of the pump torque adjustment amount Qadj. For example, when there is a service tool (PC 50) that is used ordinarily for test that is performed after machine assembly, a pump torque correction menu is added to the tool, and a mechanism for executing correction by pressing down a start button from the PC 50 is desirably provided.

Figure 9:
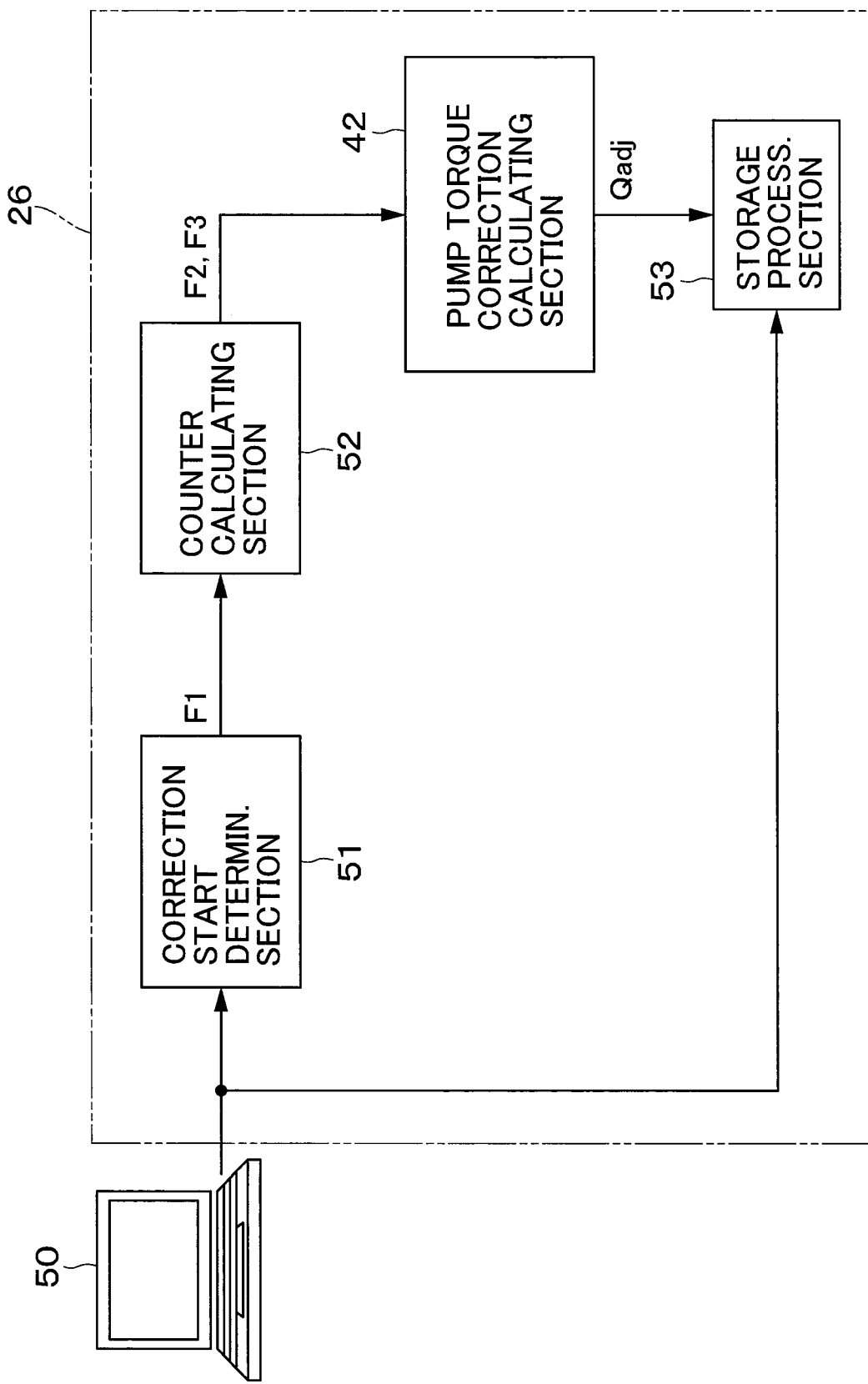
FIG. 9 is a block diagram showing the configuration of a part that performs pump torque correction by an operation from an exterior device, with respect to the controller according to the first embodiment.

FIG. 9 shows a functional block diagram of the controller 26, with respect to the part that executes the calculation processing of the pump torque adjustment amount Qadj based on an exterior command. The controller 26 includes a correction start determining section 51, a counter calculating section 52, and a storage processing section 53, in addition to the pump torque correction calculating section 42.

The correction start determining section 51 determines whether or not it is possible to start calculation processing of the pump torque adjustment amount Qadj. Specifically, the correction start determining section 51 determines whether or not the calculation of the pump torque adjustment amount Qadj can be started at the time of receiving a start trigger from the PC 50. The correction start determining section 51 switches a pump torque correction start flag F1 between valid and invalid in response to the determination result. The pump torque correction start flag F1 is inputted to the counter calculating section 52.

The counter calculating section 52 starts the calculation of the pump torque adjustment amount Qadj when the pump torque correction start flag F1 is valid. When the pump torque adjustment amount Qadj is calculated, the counter calculating section 52 finishes the calculation of the pump torque adjustment amount Qadj. Specifically, the counter calculating section 52 switches a pump torque correction executing flag F2 between valid and invalid, in response to the pump torque correction start flag F1. The counter calculating section 52 measures a time from calculation start (measurement start) of the pump torque adjustment amount Qadj, and switches a pump torque correction finishing flag F3 to valid from invalid when a time (measurement time) required for measurement set in advance elapses.

The storage processing section 53 writes the pump torque adjustment amount Qadj into the memory 46 composed of a nonvolatile memory region such as EEPROM, for example, when the pump torque adjustment amount Qadj is calculated in the pump torque correction calculating section 42. Thereby, after the vehicle body is actuated next time, the controller 26 corrects the pump torque target value Tp based on the pump torque adjustment amount Qadj stored in the memory 46. Consequently, the controller 26 can control the pump output in the corrected state. However, when a situation in which the hydraulic pump is replaced occurs, it is necessary to calculate the pump torque adjustment amount Qadj again. At that time, the storage processing section 53 initializes the pump torque adjustment amount Qadj that is already stored in the memory 46. As for an initializing operation, an initialization order can be desirably executed to the controller 26 with button depression from the service tool as a trigger, as similar to the time of executing the calculation processing of the pump torque adjustment amount Qadj.

Figure 10:
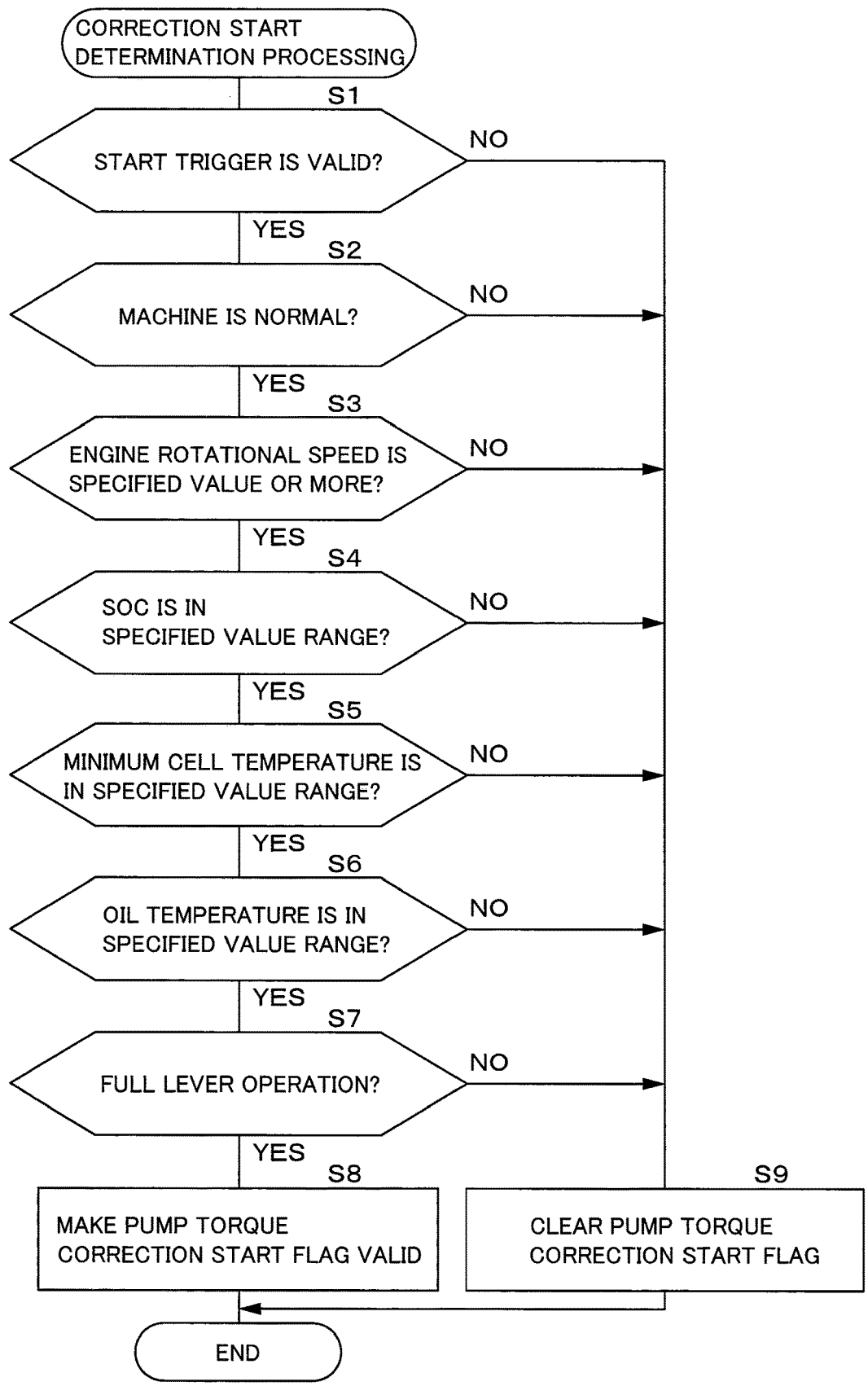
FIG. 10 is a flowchart showing correction start determination processing.
Figure 11:
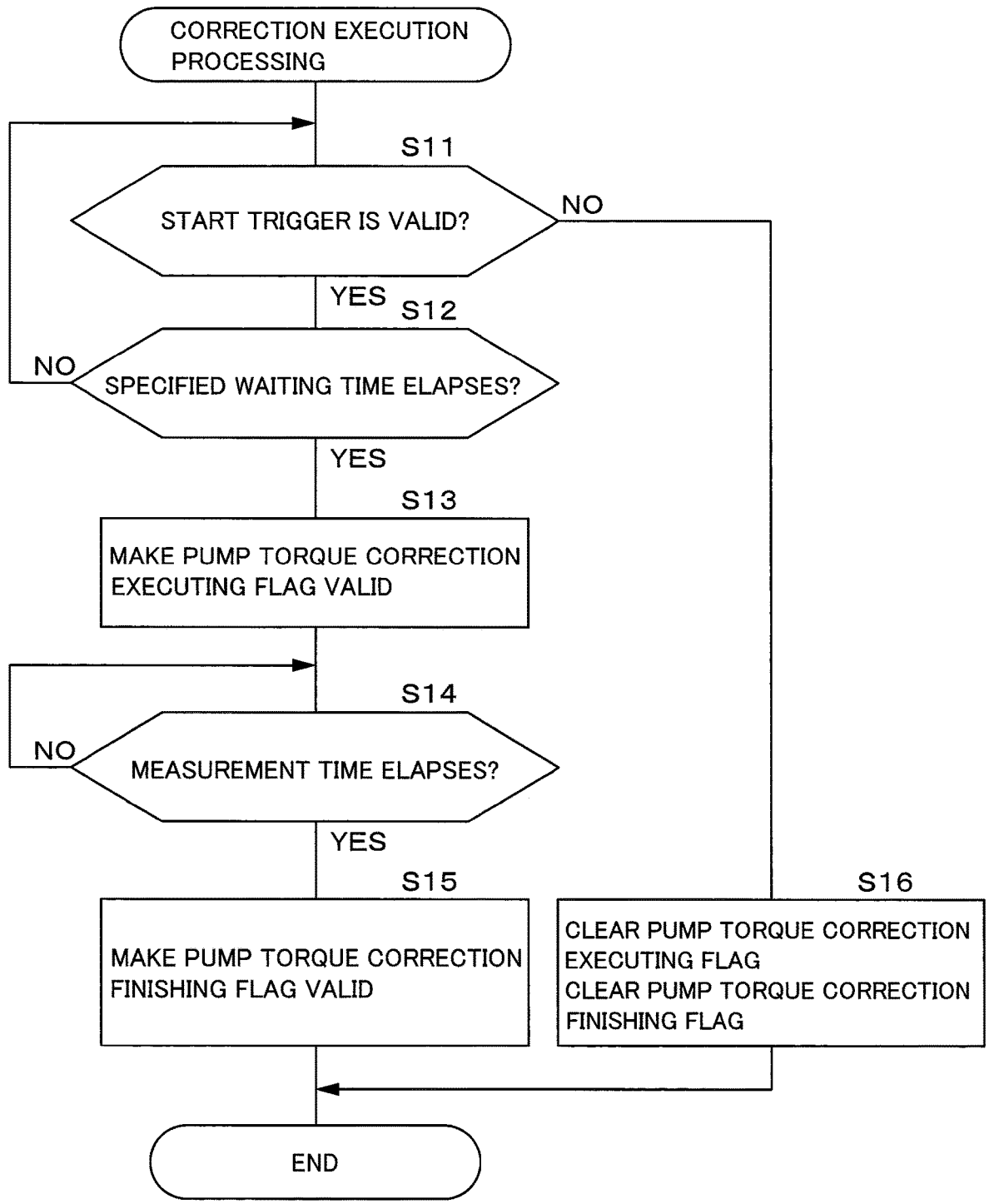
FIG. 11 is a flowchart showing correction execution processing.
Figure 12:
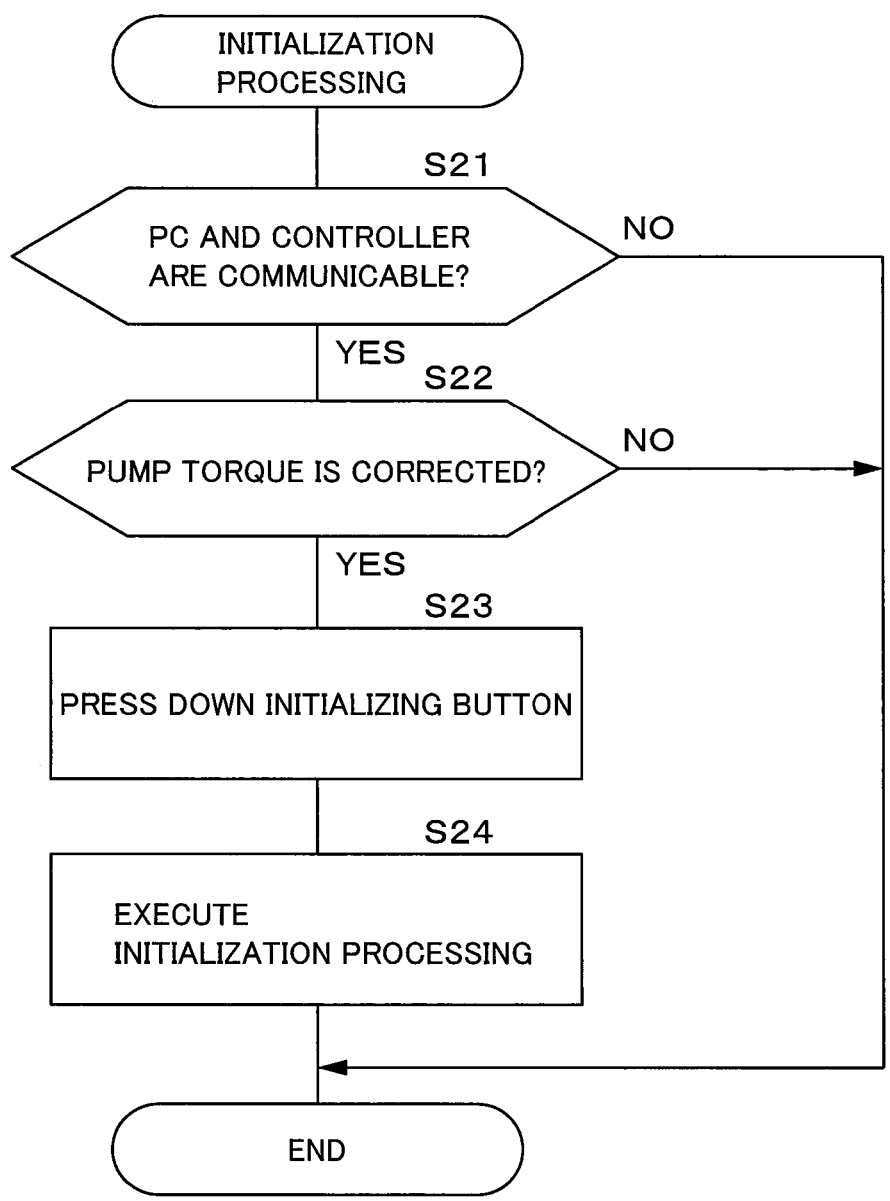
FIG. 12 is a flowchart showing initialization processing.

Next, an explanation will be made of processing contents at the time of executing correction of the pump torque, and at the time of initializing the memory 46 with reference to FIG. 10 to FIG. 12.

First, a content of correction start determination processing executed by the correction start determining section 51 will be described with reference to FIG. 10. FIG. 10 shows a flowchart of the correction start determination processing executed by the correction start determining section 51. In the correction start determination processing, a start condition for starting the calculation of the pump torque adjustment amount Qadj is determined.

In step S1, it is determined whether or not a start trigger is valid. When the start trigger is valid, it is determined as "YES" in step S1, and the process proceeds to step S2. In step S2, it is determined whether or not the machine is in abnormality. When various equipment failures occur as in a case where electric equipment devices such as a sensor necessary for pump control, and an electromagnetic proportional valve cause the breaking of a wire or a short circuit, or in a case where a system error of the electric system occurs, the pump torque adjustment amount Qadj of a normal value cannot be calculated. Consequently, non-failure in the machine is set as one of the conditions for starting calculation of the pump torque adjustment amount Qadj. When the machine is not in abnormality, it is determined as "YES" in step S2, and the process proceeds to step S3.

In step S3, it is determined whether or not the engine rotational speed ωe is a specified value or more. For the specified value of the engine rotational speed ωe, a rotational speed that is necessary for the vehicle body to issue high output is set, for example. When the engine rotational speed ωe is the specified value or more, it is determined as "YES" in step S3, and the process proceeds to step S4.

In step S4, it is determined whether or not the state of charge SOC of the electricity storage device 34 is kept within a range of a specified value. When the calculation of the pump torque adjustment amount Qadj is executed in a state where the state of charge SOC is excessively discharged, the power assist amount by the motor generator 30 is reduced, and there arises the possibility that the current integrating value deviates greatly from the reference value AH0 of the current integrating value set in advance, which makes it difficult to determine a normal measurement result. When the state of charge SOC of the electricity storage device 34 is within the range of the specified value, it is determined as "YES" in step S4, and the process proceeds to step S5.

In step S5, it is determined whether or not the minimum cell temperature received from the BCU 36 is within the range of the specified value. When the minimum cell temperature is a significantly low temperature, an internal resistance of the cell increases, and the output of the motor generator 30 which is acquired is lower as compared with that at a normal temperature time. Thereby, the influence occurs in the vehicle body output, and therefore the specified range of the minimum cell temperature is set to a temperature at which the motor output is not reduced. When the minimum cell temperature is within the range of the specified value, it is determined as "YES" in step S5, and the process proceeds to step S6.

In step S6, it is determined whether or not the hydraulic oil temperature is within the range of the specified value. When the hydraulic oil temperature is in an excessively low temperature state or high temperature state, there is a possibility that the viscosity of the hydraulic oil is influenced thereby. Therefore, there arises a possibility of the pressure characteristic changing or a possibility that control of limiting the vehicle body output works from a viewpoint of preventing a low-temperature state and a high-temperature state. Therefore, in step S6, the temperature condition of the hydraulic oil temperature is determined. When the hydraulic oil temperature is within the range of the specified value, it is determined as "YES" in step S6, and the process proceeds to step 7.

In step S7, it is determined whether or not the operating amount OA of the operation device 11 is maximum (full lever operation). The calculation processing of the pump torque adjustment amount Qadj is executed at the time of driving the front actuator (cylinders 5D to 5F), for example. Therefore, the determination is made from the operating amount of the control lever 11A. It should be noted that an aim of the determination content of step S7 is to increase the vehicle body output (pump output) to a maximum output (maximum required pump flow rate). Therefore, the operation is not limited to the working operation for operating the working mechanism 5, but may be, for example, a revolving operation or traveling operation, a compound operation of combining the working operation and the revolving operation, and any operation as long as the operation requires high output. Further, the operating amount OA does not always have to be a maximum value, but may have a value (operating amount OA1, for example) at which the required pump flow rate Q0 reaches a maximum value. When the operating amount OA of the operation device 11 is the maximum value, it is determined as "YES" in step S7, and the process proceeds to step S8.

In this way, when conditions are established in all of steps S1 to S7, that is, when it is determined as "YES" in all of steps S1 to S7, the pump torque correction start flag F1 is made valid in step S8. The pump torque correction start flag F1 is sent to the counter calculating section 52. On the other hand, when the conditions are unestablished in any of steps S1 to S7, that is, when it is determined as "NO" in any of steps S1 to S7, the pump torque correction start flag F1 is made invalid in step S9.

Next, an explanation will be made of a content of the correction execution processing executed by the counter calculating section 52 with reference to FIG. 11. FIG. 11 shows a flowchart of the correction execution processing.

In step S11, the pump torque correction start flag F1 is determined. When the pump torque correction start flag F1 is valid, it is determined as "YES" in step S11, and the process proceeds to step S12. In step S12, it is determined whether or not a prescribed waiting time determined in advance elapses. The reason why the waiting time is provided lies in that an abrupt rise of the current occurs immediately after start of pump torque correction, and a current value cannot be measured stably. Since the current value is stabilized immediately, the waiting time can be about several seconds, for example. When the waiting time does not elapse, it is determined as "NO" in step S12, and the processing of step S11 and the following steps are repeated. When the waiting time elapses, it is determined as "YES" in step S12, and the process proceeds to step S13.

In step S13, the pump torque correction executing flag F2 is made valid. At a time point at which the pump torque correction executing flag F2 becomes valid, the controller 26 actuates the pump torque correction calculating section 42. In subsequent step S14, it is determined whether or not a measurement time elapses. The measurement time is determined by considering how much the vehicle body output can keep the high output. Consequently, the measurement time is set to be several seconds to ten and several seconds, for example, as the time in which measurement is enabled sufficiently. When the measurement time does not elapse, it is determined as "NO" in step S14, and the controller 26 waits as it is. When the measurement time elapses, it is determined as "YES" in step S14, and the process proceeds to step S15.

In step S15, a pump torque correction finishing flag F3 is made valid. In the present embodiment, since the operator works on the PC 50, it is necessary to notify whether or not the measurement is completed. When the pump torque correction finishing flag F3 is valid, the notification action of measurement completion is carried out on a screen on the PC 50. It should be noted that a time until measurement completion may be shown by a progress bar other than measurement completion notice. When the operation is completed, it is received that the start trigger is invalid from the PC 50. At this time, since the pump torque correction start flag F1 becomes invalid, it is determined as "NO" in step S11, and the process proceeds to step S16. In step S16, the pump torque correction executing flag F2 and the pump torque correction finishing flag F3 are made invalid.

Next, an explanation will be made of a content of initialization processing of initializing the memory 46 with reference to FIG. 12. FIG. 12 shows a flowchart of the initialization processing. In FIG. 12, initialization of the pump torque adjustment amount Qadj is assumed to be executed when an initialization button is pressed down in the PC 50 as the service tool. Consequently, the initialization processing in FIG. 12 is executed by the PC 50 and the controller 26.

In step S21, it is determined whether or not communication is possible mutually between the PC 50 and the controller 26 at the time of actuation of the service tool. When the communication is possible, it is determined as "YES" in step S21, and the process proceeds to step S22.

In step S22, it is determined whether or not correction processing of the pump torque is finished from the controller 26. That is, in step S22, it is determined whether or not the pump torque adjustment amount Qadj is already stored in the memory 46. Specifically, the PC 50 receives a signal corresponding to the pump torque adjustment amount Qadj stored in the memory 46 from the controller 26, and determines whether or not the correction processing is finished based on the signal. When the correction processing is finished, it is determined as "YES" in step S22, and the process proceeds to step S23.

It should be noted that at the service tool side, the initialization button can be activated only when the signal at the time of the correction processing being finished is received from the controller 26. Specifically, the initialization button is kept to be inactivated in a case where a numeric value of the pump torque adjustment amount Qadj stored in the memory 46 is 0 (zero) or a value defined as invalid data.

In step S23, the operator presses down the initialization button in the PC 50. Thereby, a trigger for executing initialization of the memory 46 is outputted (transmitted) to the controller 26 from the PC 50.

In subsequent step S24, the controller 26 clears the pump torque adjustment amount Qadj stored in the memory 46 at the time of receiving the trigger as an execution command of initialization from the PC 50. It should be noted that at the time of updating software, the parameters stored in the memory 46 configured by a nonvolatile memory are all initialized in general. At this time, when the pump torque adjustment amount Qadj is cleared together, there arises a problem that the correction operation has to be executed each time of updating. Therefore, the pump torque adjustment amount Qadj is disposed in a region, which is not initialized at the time of updating software, in the memory 46. The pump torque adjustment amount Qadj is preferably initialized only after the initialization processing shown in FIG. 12 is executed.

Thus, according to the first embodiment, the controller 26 includes the integrator 42A (index acquiring section) that acquires a current integrating value AH1 acquired by integrating the current value of the current I that flows into the motor generator 30 from the electricity storage device 34 as an index. Specifically, the hydraulic excavator 1 includes the current measurement section 38 that measures the current I that is transferred between the electricity storage device 34 and the motor generator 30. The integrator 42A integrates the current value of the current I flowing into the motor generator 30, which is measured by the current measurement section 38 when the hydraulic actuator (the hydraulic motors 2A and 3A, the cylinders 5D to 5F) drives, and acquires the current integrating value AH1 as the index. The controller 26 acquires the pump torque adjustment amount Qadj for correcting the pump torque target value Tp based on the deviation ΔAH between the current integrating value AH1 (index) that is acquired by the integrator 42A (index acquiring section) when the hydraulic actuator drives, and the current integrating reference value AH0 (index reference value) acquired by measuring the current integrating value in advance by using the engine 20 and the hydraulic pump 22 which are references. Consequently, the calculation of the pump torque adjustment amount Qadj can be executed by an operation of the vehicle body for about several tens seconds, for example, which can contribute to a reduction in the number of calibration steps immediately after assembly and to a reduction in working time.

Further, since the pump torque adjustment amount Qadj is acquired based on the current value of the current I which flows into the motor generator 30 when the hydraulic actuator drives, correction of the pump torque can be performed with the driving characteristic of the motor generator 30 also taken into consideration. Therefore, even when the motor generator 30 performs an assist operation in the hybrid type hydraulic excavator 1, an output variation of the hydraulic pump 22 can be suppressed with the assist operation of the motor generator 30 taken into consideration.

Further, the controller 26 includes the memory 46 for storing the pump torque adjustment amount Qadj, and adjusts the pump torque target value Tp based on the pump torque adjustment amount Qadj stored in the memory 46. Therefore, when the calculation processing of the pump torque adjustment amount Qadj is executed in the calibration work immediately after assembly, for example, the calculated pump torque adjustment amount Qadj can be stored in the memory 46. At the time of actuation of the next time and the following times, the controller 26 can adjust the pump torque target value Tp by using the pump torque adjustment amount Qadj stored in the memory 46. As a result, the calculation load on the controller 26 can be made lower as compared with a case where the pump torque adjustment amount Qadj is consecutively calculated.

Further, the controller 26 executes any processing of the processing of acquiring the pump torque adjustment amount Qadj and the processing of initializing the pump torque adjustment amount Qadj stored in the memory 46, based on the command from the communicable PC 50 (exterior device). Therefore, at the time of calibration work immediately after assembly, the controller 26 can execute the processing of acquiring the pump torque adjustment amount Qadj based on the command from the PC 50. Further, at such a maintenance time as the hydraulic pump 22 being replaced, the controller 26 can initialize the pump torque adjustment amount Qadj stored in the memory 46 based on the command from the PC 50. In this case, the controller 26 executes the processing of acquiring the pump torque adjustment amount Qadj anew, and can update the pump torque adjustment amount Qadj to a value corresponding to the new hydraulic pump 22.

It should be noted that the first embodiment is explained by taking a case where the correction processing of the pump torque is executed by operating the PC 50 as the exterior device, as an example. The present invention is not limited thereto, but, for example, the correction processing of the pump torque may be executed by operating the monitor device 10 mounded on the hydraulic excavator 1 in advance, instead of the exterior computer.

Figure 13:
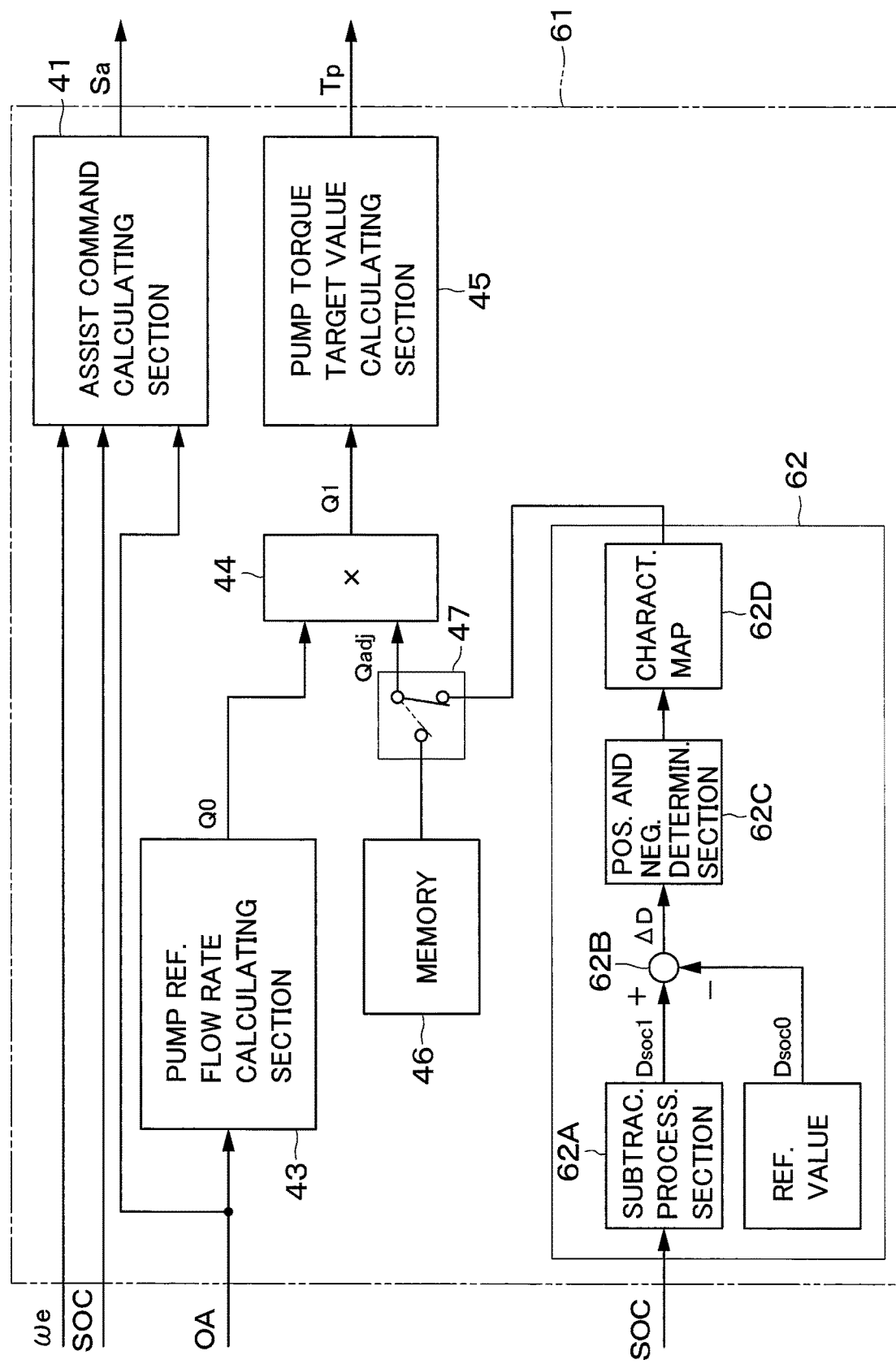
FIG. 13 is a block diagram showing the configuration of a part relating to pump torque correction, with respect to a controller according to a second embodiment.

Next, FIG. 13 shows a controller according to a second embodiment of the present invention. A characteristic of the second embodiment lies in that the controller acquires a pump torque adjustment amount based on a deviation between a charging rate reduction amount (index) at the time of driving a hydraulic actuator, and a charging rate reduction amount reference value (index reference value) acquired by measuring the charging rate reduction amount in advance by using the engine and the hydraulic pump which are the references. It should be noted that in the second embodiment, components identical to those in the above-mentioned first embodiment will be referred to as identical reference numerals, and an explanation thereof will be omitted.

A controller 61 according to the second embodiment is configured substantially similar to the controller 26 according to the first embodiment. Therefore, the controller 61 includes the assist command calculating section 41, a pump torque correction calculating section 62, the pump reference flow rate calculating section 43, the multiplier 44, the pump torque target value calculating section 45, the memory 46 and the switch 47. However, the pump torque correction calculating section 62 calculates the pump torque adjustment amount Qadj based on a reduction amount Dsoc1 (charging rate reduction amount) of the state of charge SOC of the electricity storage device 34. In this point, the controller 61 according to the second embodiment differs from the controller 26 according to the first embodiment. The pump torque correction calculating section 62 has a subtraction processing section 62A, a deviation calculating section 62B, a positive and negative determination section 62C, and a characteristic map 62D.

The subtraction processing section 62A subtracts a value at a time after a specified time (several seconds, for example) elapses from a value at an operation starting time with respect to the state of charge SOC of the electricity storage device 34, and acquires the reduction amount Dsoc1. At this time, the subtraction processing section 62A serves as an index acquiring section that acquires the reduction amount Dsoc1 of the state of charge SOC calculated by the SOC estimating section 40 of the BCU 36 when the hydraulic actuator (the hydraulic motors 2A and 3A, the cylinders 5D to 5F) drives, and acquires the charging rate reduction amount as the index. The deviation calculating section 62B subtracts the reference value Dsoc0 from the measured reduction amount Dsoc1, and acquires the deviation ΔD between the measured reduction amount Dsoc1 and the reference value Dsoc0.

Here, the reference value Dsoc0 is a reduction amount of the state of charge SOC, which is measured in advance in a machine on which the engine 20 and the hydraulic pump 22 which each are the reference are mounted. Specifically, the reduction amount of the state of charge SOC is measured in advance in the machine on which the engine 20 and the hydraulic pump 22 calibrated without a tolerance are mounted. The reduction amount is the reference value Dsoc0, and the reference value Dsoc0 is stored in the controller 61 as a control parameter.

The positive and negative determination section 62C determines whether the vehicle body output is high or low with respect to the machine which is the reference based on the deviation ΔD which is outputted from the deviation calculating section 62B. The characteristic map 62D acquires the pump torque adjustment amount Qadj from the deviation ΔD, with the determination result of the positive and negative determination section 62C taken into consideration. When the result of the deviation ΔD is negative, the vehicle body output is lower than the reference, and therefore, the characteristic map 62D acquires such a pump torque adjustment amount Qadj that increases the pump output. When the result of the deviation ΔD is positive on the other hand, the vehicle body output is higher than the reference, and therefore, the characteristic map 62D acquires such a pump torque adjustment amount Qadj that limits the pump output.

In this way, in the second embodiment, an operational effect substantially similar to that of the first embodiment also can be acquired. The controller 61 according to the second embodiment includes the subtraction processing section 62A (index acquiring section) that acquires the reduction amount $\Delta soc1$ of the state of charge SOC of the electricity storage device 34 as the index. Specifically, the hydraulic excavator 1 includes the SOC estimating section 40 (charging rate calculating section) that calculates the state of charge SOC (charging rate) of the electricity storage device 34. The subtraction processing section 62A acquires the reduction amount $\Delta soc1$ of the state of charge SOC calculated in the SOC estimating section 40 when the hydraulic actuator (the hydraulic motors 2A and 3A, the cylinders 5D to 5F) drives, and acquires the charging rate reduction amount as the index. The controller 61 acquires the pump torque adjustment amount Qadj for correcting the pump torque target value Tp based on the deviation between the reduction amount $\Delta soc1$ (index) acquired by the subtraction processing section 62A when the hydraulic actuator drives, and the reference value Dsoc0 (index reference value) acquired by measuring the reduction amount of the state of charge SOC in advance by using the engine 20 and the hydraulic pump 22 which are the reference. That is, the controller 61 acquires the pump torque adjustment amount Qadj by using the reduction amount $\Delta soc1$ of the state of charge SOC in place of the current integrating value. At this time, the reduction amount $\Delta soc1$ of the state of charge SOC also changes in response to the current integrating value. Therefore, the pump torque correction calculating section 62 of the controller 61 according to the second embodiment also can acquire the pump torque adjustment amount Qadj as in the first embodiment.

It should be noted that precision of the current I depends on measurement precision of the BCU 36 (current measurement section 38). Further, precision of the state of charge SOC depends on measurement precision of the voltage measurement section 37 and calculation precision of the SOC estimating section 40 in addition to the measurement precision of the current measurement section 38. Consequently, the controller may include both of the pump torque correction calculating section 42 according to the first embodiment, and the pump torque correction calculating section 62 according to the second embodiment, and may choose which of the current I and the state of charge SOC to use. Further, the pump torque correction calculating section 42 according to the first embodiment, and the pump torque correction calculating section 62 according to the second embodiment may be configured to be switched in response to the trigger from outside.

The aforementioned embodiments are explained by taking the crawler type hybrid hydraulic excavator 1 as an example as the construction machine. The present invention is not limited thereto, but is applicable to any construction machine including a motor generator connected to an engine and a hydraulic pump, and a hydraulic actuator driven by a hydraulic pump, for example, various construction machines such as wheel type hybrid hydraulic excavators, and hybrid wheel loaders.

DESCRIPTION OF REFERENCE NUMERALS

1: Hydraulic excavator (Construction machine)
2A, 3A: Hydraulic motor (Hydraulic actuator)
5D: Boom cylinder (Hydraulic actuator)
5E: Arm cylinder (Hydraulic actuator)
5F: Bucket cylinder (Hydraulic actuator)
11: Operation device
20: Engine
22: Hydraulic pump
23: Hydraulic pump regulator
24: Electromagnetic proportional valve for hydraulic pump (Pump torque adjustment device)
26, 61: Controller
30: Motor generator
34: Electricity storage device
36: Battery control unit (BCU)
37: Voltage measurement section
38: Current measurement section
40: SOC estimating section (Charging rate calculating section)
41: Assist command calculating section
42, 62: Pump torque correction calculating section
43: Pump reference flow rate calculating section
44: Multiplier
45: Pump torque target value calculating section
46: Memory
50: Computer (Exterior device)

The invention claimed is:

1. A construction machine comprising:
a hydraulic pump that is driven by an engine;
a pump torque adjustment device to adjust pump torque of the hydraulic pump in response to a pump torque target value;
a hydraulic actuator to be operated by delivery pressure of the hydraulic pump;
a motor generator connected to the engine;
an inverter and an electricity storage device configured to drive the motor generator; and
a controller configured to calculate the pump torque target value, characterized in that:
the controller
includes an index acquiring section configured to acquire at least any one of a current integrating value acquired by integrating a current value of a current flowing to the motor generator from the electricity storage device, and a charging rate reduction amount of the electricity storage device, as an index, and
acquires a pump torque adjustment amount for correcting the pump torque target value, based on a deviation between the index acquired by the index acquiring section when the hydraulic actuator is driven, and an index reference value acquired by measuring the index in advance by using a reference engine and a reference hydraulic pump as references.

2. The construction machine according to claim 1, wherein
the controller includes a memory configured to store the pump torque adjustment amount, and adjusts the pump torque target value based on the pump torque adjustment amount stored in the memory.

3. The construction machine according to claim 2, wherein
the controller executes any processing of processing of acquiring the pump torque adjustment amount, and processing of initializing the pump torque adjustment amount stored in the memory, based on a command from a communicable exterior device.

4. The construction machine according to claim 1, comprising:
a current measurement section configured to measure a current that is transferred between the electricity storage device and the motor generator, wherein the index acquiring section integrates a current value of a current flowing into the motor generator that is measured by the current measurement section when the hydraulic actuator is driven, and acquires a current integrating value as the index.

5. The construction machine according to claim 1, comprising:
a charging rate calculating section configured to calculate a charging rate of the electricity storage device,
wherein the index acquiring section acquires a reduction amount of a charging rate calculated in the charging rate calculating section when the hydraulic actuator is driven, and acquires a charging rate reduction amount as the index.

* * * * *